(No Model.)
J. BRAUER.
REST FOR ICE PITCHERS.
No. 290,520. Patented Dec. 18, 1883.
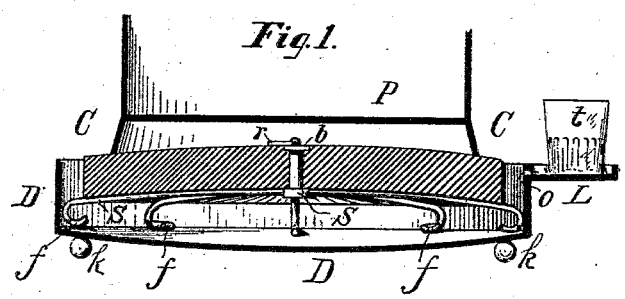
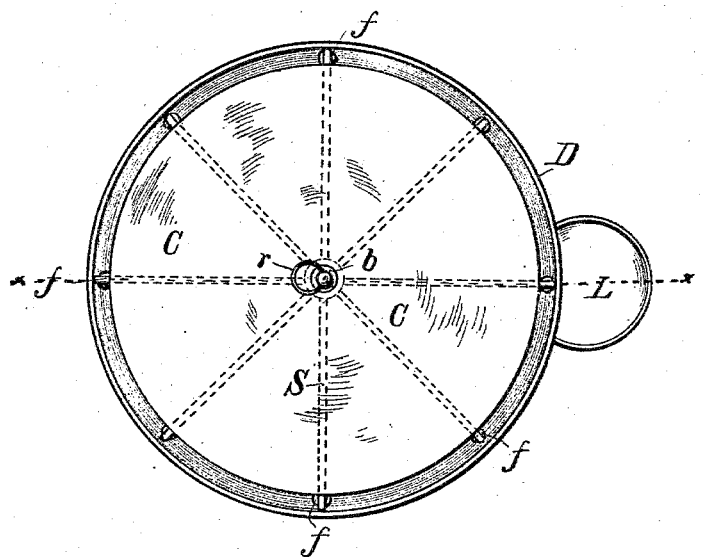
WITNESSES:
N. Coulter
John Nolan
INVENTOR
Justus Brauer,
per Joshua Pusey,
atty

UNITED STATES PATENT OFFICE.

JUSTUS BRAUER, OF PHILADELPHIA, PENNSYLVANIA.

REST FOR ICE-PITCHERS.

SPECIFICATION forming part of Letters Patent No. 290,520, dated December 18, 1883.

Application filed October 20, 1883. (No model.)

*To all whom it may concern:*

Be it known that I, JUSTUS BRAUER, a citizen of the United States, and a resident of the city and county of Philadelphia, and State of Pennsylvania, have invented certain new and useful Improvements in Rests for Ice-Pitchers, of which the following is a full, clear, and exact description, reference being had to the accompanying drawings, of which—

Figure 1 is a vertical section on the line $x\ x$, Fig. 2; and Fig. 2 is a plan or top view.

The nature of this invention is a table-rest for ice-pitchers; and it consists, generally, of the combination, with a drip-cup, of a cork disk, upon which the bottom of the pitcher is intended to rest, which disk is supported above the bottom of said cup, the water that usually condenses upon the outside of the pitcher and runs down the latter finding its way into the cup. The invention also includes certain details of construction of the device, which will be described, and specifically pointed out in the claims.

The drip-cup referred to (marked D in the annexed drawings) is preferably made of sheet metal, and has small knobs $k$ on its under side, upon which it stands upon the table, counter, &c. A disk of cork, C, preferably dished, as shown in Fig. 1, and of a diameter somewhat greater than that of the bottom of the ordinary ice-pitcher, P, and of less diameter than that of cup D, is sustained above the bottom of the latter upon a spider, S, in the present instance of wire, and whose feet $f$ rest upon the bottom of the cup. A stud, $b$, at the point of convergence of the spider-legs, which stud connects them together, extends up through the cork disk, and has a ring, $r$, secured to its end. The disk and spider being thus fastened together, they may be integrally removed from the drip-cup when it becomes necessary or desirable to empty the cup of the water collected therein.

I prefer to make the disk C of cork, for the reason that it is soft and not liable to be injured or split from the effects of water.

It is obvious that the water which may condense upon and trickle down the sides of the pitcher will run off the edges of the disk and fall into the receptacle D, from which it may be readily removed from time to time.

I sometimes also use a support for a tumbler, $t$, Fig. 1, consisting of a rimmed ledge, L, secured to the side of the drip-cup, and communicating with the interior of the latter by an opening, O, Fig. 1, through which the water or drippings from the tumbler escape into said cup. If thought desirable, disk C may be made large enough to fit closely against the inside of the rim of cup D, in which case the latter should be provided with numerous perforations as inlets for the water.

It is unnecessary to describe the various modifications in form and material of the invention which may be made, as any one skilled in the art to which it appertains can readily make the same.

Having thus described my invention, I claim as new and wish to secure by Letters Patent—

1. The pitcher-rest consisting of the combination of the drip-cup and the disk, of cork or other suitable similar material, supported above and out of contact with the bottom of said cup, substantially as and for the purpose set forth.

2. The combination of the drip-cup and the removable cork disk supported above and out of contact with the bottom of said cup, substantially as and for the purpose described.

3. The combination of the drip-cup and the integrally-connected disk and spider, all constructed, combined, and adapted to operate substantially as and for the purpose stated.

In testimony whereof I have hereunto affixed my signature this 8th day of October, A. D. 1883.

JUSTUS BRAUER.

Witnesses:
JOHN NOLAN,
CHAS. MATHEWS, Jr.